(12) United States Patent
Lu et al.

(10) Patent No.: US 11,549,891 B2
(45) Date of Patent: Jan. 10, 2023

(54) AUTOMATIC OPTICAL INSPECTION DEVICE AND METHOD

(71) Applicant: SHANGHAI MICRO ELECTRONICS EQUIPMENT (GROUP) CO., LTD., Shanghai (CN)

(72) Inventors: Hailiang Lu, Shanghai (CN); Junwei Jia, Shanghai (CN); Pengli Zhang, Shanghai (CN); Hongji Zhou, Shanghai (CN); Wen Xu, Shanghai (CN); Fan Wang, Shanghai (CN)

(73) Assignee: SHANGHAI MICRO ELECTRONICS EQUIPMENT (GROUP) CO., LTD., Shanghai (CN)

( * ) Notice: Subject to any disclaimer, the term of this patent is extended or adjusted under 35 U.S.C. 154(b) by 410 days.

(21) Appl. No.: 16/306,433

(22) PCT Filed: Jul. 31, 2017

(86) PCT No.: PCT/CN2017/095222
§ 371 (c)(1),
(2) Date: Nov. 30, 2018

(87) PCT Pub. No.: WO2017/206966
PCT Pub. Date: Dec. 7, 2017

(65) Prior Publication Data
US 2019/0293566 A1 Sep. 26, 2019

(30) Foreign Application Priority Data
May 31, 2016 (CN) .......................... 201610379093.2

(51) Int. Cl.
G01N 21/88 (2006.01)
G01N 21/01 (2006.01)

(52) U.S. Cl.
CPC ......... *G01N 21/8806* (2013.01); *G01N 21/01* (2013.01); *G01N 21/88* (2013.01);
(Continued)

(58) Field of Classification Search
CPC ............... G01N 21/88; G01N 21/8806; G01N 21/9501; G01N 21/01
(Continued)

(56) References Cited

U.S. PATENT DOCUMENTS 6,166,366 A * 12/2000 Lewis ..................... G01N 21/89
250/208.1
2004/0263836 A1* 12/2004 Eom .................. G01N 21/9501
356/237.4

(Continued)

FOREIGN PATENT DOCUMENTS

CN 101819165 A 9/2010
CN 101887030 A 11/2010
(Continued)

*Primary Examiner* — Seung C Sohn
(74) *Attorney, Agent, or Firm* — Muncy, Geissler, Olds & Lowe, P.C.

(57) ABSTRACT

An automatic optical inspection (AOI) device and method are disclosed. The device is adapted to inspect an object under inspection (OUI) (102) carried on a workpiece stage (101) and includes: a plurality of detectors (111, 112) for capturing images of the OUI (102); a plurality of light sources (121, 122) for illuminating the OUI (102) in different illumination modes; and a synchronization controller (140) signal-coupled to both the plurality of detectors (111, 112) and the plurality of light sources (121, 122). The synchronization controller (140) is configured to directly or indirectly control the plurality of detectors (111, 112) and the plurality of light sources (121, 122) based on the position of the OUI (102) so that each of them is individually activated and deactivated according to a timing profile, that each of the detectors (111, 112) is able to capture images of the OUI (Continued)

(102) in an illumination mode provided by a corresponding one of the light sources (121, 122), and that when any one of the light sources (121, 122) is illuminating the OUI (102), only the one of the detectors (111, 112) corresponding to this light source (121, 122) is activated. Through the timing control over the multiple light sources (121, 122) and detectors (111, 112) by the synchronization controller (140), inspection with multiple measurement configurations can be accomplished within a single scan, resulting in a significant improvement in inspection efficiency.

14 Claims, 5 Drawing Sheets

(52) U.S. Cl.
CPC ............... *G01N 2021/0162* (2013.01); *G01N 2021/8825* (2013.01); *G01N 2021/8838* (2013.01); *G01N 2201/0694* (2013.01); *G01N 2201/0696* (2013.01)

(58) Field of Classification Search
USPC ...................................................... 250/578.1
See application file for complete search history.

(56) References Cited

U.S. PATENT DOCUMENTS

| | | | |
|---|---|---|---|
| 2005/0036671 | A1 | 2/2005 | Watkins et al. |
| 2009/0206066 | A1* | 8/2009 | Rekowski ............ B23K 26/082 219/121.81 |
| 2011/0310244 | A1* | 12/2011 | Schweitzer .......... G01N 21/896 348/92 |
| 2019/0043182 | A1* | 2/2019 | Wang ..................... G06T 7/001 |

FOREIGN PATENT DOCUMENTS

| | | |
|---|---|---|
| CN | 102590226 A | 7/2012 |
| CN | 102636498 A | 8/2012 |
| CN | 203490180 U | 3/2014 |
| CN | 103884650 A | 6/2014 |
| CN | 104458760 A | 3/2015 |
| CN | 104897693 A | 9/2015 |
| CN | 105259189 A | 1/2016 |
| JP | 2010223613 A | 10/2010 |
| TW | 201208472 A | 2/2012 |
| TW | I450628 B | 8/2014 |
| WO | WO-2016015790 A1 | 2/2016 |

* cited by examiner

AUTOMATIC OPTICAL INSPECTION DEVICE AND METHOD

TECHNICAL FIELD

The present invention relates to the field of semiconductor inspection and, in particular, to an automatic optical inspection (AOI) device and method.

BACKGROUND

Automatic optical inspection (AOI) is capable of fast, high-precision, nondestructive inspection of wafers, chips or other objects under inspection (OUIs) and has been widely used in PCB, IC wafer, LED, TFT, solar panel and other many applications. The AOI technique usually utilizes a high-precision optical imaging system for imaging of an OUI. The OUI is carried on a workpiece stage and moved at a high speed for scanning to achieve high-speed measurement. In addition, the system identifies defects on the surface of the OUI by comparison between scanned and ideal reference images, feature extraction or the like.

Since there are diverse types of OUI defects with different optical characteristics, an AOI device is usually equipped with multiple measurement configurations to cope with different types of defects. For example, a configuration with bright-field illumination can be used to detect contamination, scratches, etc., and higher sensitivity can be obtained when using dark-field illumination to detect small particles. Therefore, in the field of wafer defect inspection, in order to improve detection sensitivity and yield, it is a common practice to inspect a single wafer with various measurement configurations.

For example, a conventional AOI system first captures images of wafer surfaces and is then trained on the images to generate an ideal image which is compared with actually captured images to identify defects. During scanning, the workpiece stage carries a wafer to move at a high speed, with a detector scanning and inspecting the wafer in a bright-field illumination mode. Subsequent to the scanning with a bright-field configuration, the system is switched to dark-field illumination, and the same detector again scans and inspects the wafer. FIG. 1 shows a timing diagram of this process. As shown, each wafer is scanned twice, inevitably leading to a reduced wafer inspection speed, increased inspection time and thus lower inspection efficiency. Moreover, the same detector is used for both bright- and dark-field scans. However, the performance (mainly frame rate) of existing detectors does not allow switch between two consecutive exposure cycles in a very short time. This places a further limitation on inspection efficiency.

SUMMARY OF THE INVENTION

The present invention provides an automatic optical inspection (AOI) device and method in order to overcome the above problems.

In order to solve the problems, the provided AOI device for inspecting an object under inspection (OUI) carried on a workpiece stage includes:

a plurality of detectors for capturing images of the object under inspection;

a plurality of light sources for illuminating the object under inspection with different illumination modes; and a synchronization controller signal-coupled to the plurality of detectors and the plurality of light sources, the synchronization controller configured to directly or indirectly control the plurality of detectors and the plurality of light sources based on a position of the object under inspection so that each of the plurality of detectors and the plurality of light sources is individually activated and deactivated according to a corresponding timing sequence, such that: each of the plurality of detectors is able to capture images of the object under inspection in an illumination mode provided by a corresponding one of the plurality of light sources; and when one of the plurality of light sources is illuminating the object under inspection, only one of the plurality of detectors corresponding to the one of the plurality of light sources is activated.

Preferably, the synchronization controller is further signal-coupled to the workpiece stage, and wherein the position of the object under inspection is obtained from a first signal sent by the workpiece stage to the synchronization controller.

Preferably, the AOI device may further include a master computer signal-coupled to each of the plurality of detectors, the plurality of light sources, the workpiece stage and the synchronization controller.

Preferably, the synchronization controller may be configured to control the activation and deactivation of each of the plurality of detectors by sending a plurality of second signals to the plurality of detectors.

Preferably, the synchronization controller may be further configured to control the activation of each of the plurality of light sources by sending a plurality of third signals to the plurality of light sources.

Preferably, the plurality of detectors are able to send a plurality of fourth signals to the synchronization controller, and wherein the synchronization controller, upon receipt of one of the plurality of fourth signals, triggers the activation of a corresponding one of the plurality of light sources by sending a corresponding one of the plurality of third signals.

Preferably, each of the plurality of detectors is able to trigger the activation of a corresponding one of the plurality of light sources by sending a fourth signal to the corresponding one of the plurality of light sources.

Preferably, the plurality of light sources may include at least two of a bright-field light source, a dark-field light source and an infrared light source.

Preferably, the plurality of light sources are pulsed light generators.

Preferably, the infrared light source may be an infrared LED emitting light with a wavelength of 780 nm or longer.

Preferably, the OUI may be a wafer, an LED substrate or a TFT panel.

Preferably, a number of the plurality of detectors is equal to a number of the plurality of light sources.

The present invention also provides an AOI method for inspecting an object under inspection (OUI) carried on a workpiece stage, the method including:

providing a plurality of detectors for capturing images of the object under inspection, a plurality of light sources for illuminating the object under inspection with different illumination modes and a synchronization controller signal-coupled to the plurality of detectors and the plurality of light sources; and directly or indirectly controlling, by the synchronization controller, the plurality of detectors and the plurality of light sources based on a position of the object under inspection so that each of the plurality of detectors and the plurality of light sources is individually activated and deactivated according to a corresponding timing sequence, such that: each of the plurality of detectors is able to capture images of the object under inspection in an illumination mode provided by a corresponding one of the plurality of light sources; and when one of the plurality of light sources is illuminating the object under inspection, only one of the plurality of detectors corresponding to the one of the plurality of light sources is activated.

Optionally, the AOI method may include the steps of:

S1) moving the object under inspection to a measurement position and sending a first signal to the synchronization controller, by the workpiece stage on which the object under inspection is carried;

S2) sending a second signal to a first detector of the plurality of detectors by the synchronization controller, thereby triggering an activation of the first detector;

S3) sending a third signal to a first light source of the plurality of light sources by the synchronization controller, emitting a first pulsed light by the first light source during the activation of the first detector, and obtaining images of the object under inspection by the first detector under an illumination of the first light source;

S4) subsequent to completion of the illumination of the first light source, sending another second signal to a second detector of the plurality of detectors by the synchronization controller, thereby triggering an activation of the second detector;

S5) after the first detector is deactivated, sending another third signal to a second light source of the plurality of light sources by the synchronization controller, emitting a second pulsed light by the second light source during the activation of the second detector, and obtaining images of the object under inspection by the second detector under an illumination of the second light source; and S6) moving the object under inspection to a new measurement position and sending another first signal to the synchronization controller by the workpiece stage, and repeating steps S2)-S6) until images of the object under inspection have been captured at all measurement positions by the plurality of detectors under the illumination of the plurality of light sources.

Preferably, the AOI method may further include: providing a master computer signal-coupled to each of the plurality of detectors, the plurality of light sources, the workpiece stage and the synchronization controller; and setting parameters of the synchronization controller, parameters of the plurality of detectors, brightness levels of the plurality of light sources and controlling a movement of the workpiece stage, by the master computer.

Optionally, the AOI method may include the steps of:

S1) moving the object under inspection to a measurement position and sending a first signal to the synchronization controller, by the workpiece stage on which the object under inspection is carried;

S2) sending a second signal to a first detector of the plurality of detectors by the synchronization controller, thereby triggering an activation of the first detector;

S3) sending a third signal to a first light source of the plurality of light sources by the first detector so as to trigger the first light source to emit a first pulsed light during the activation of the first detector and obtaining images of the object under inspection by the first detector under an illumination of the first light source;

S4) subsequent to completion of the illumination of the first light source, sending another second signal to a second detector of the plurality of detectors by the synchronization controller, thereby triggering an activation of the second detector;

S5) after the first detector is deactivated, sending another third signal to a second light source of the plurality of light sources by the second detector so as to trigger the second light source to emit a second pulsed light during the activation of the second detector obtaining images of the object under inspection by the second detector under an illumination of the second light source; and S6) moving the object under inspection to a new measurement position and sending another first signal to the synchronization controller by the workpiece stage, and repeating steps S2)-S6) until images of the object under inspection have been captured at all measurement positions by the plurality of detectors under the illumination of the plurality of light sources.

Compared to the prior art, the AOI device and method utilize the synchronization controller to directly or indirectly control the plurality of detectors and the plurality of light sources based on the position of the OUI so that each of them is individually activated and deactivated according to a timing profile, that each of the detectors is able to capture images of the OUI in an illumination mode provided by a corresponding one of the light sources, and that when any one of the light sources is illuminating the OUI, only the one of the detectors corresponding to this light source is activated. With the device and method of the present invention, inspection with multiple measurement configurations can be accomplished within a single scanning measurement process, resulting in a significant improvement in inspection efficiency.

BRIEF DESCRIPTION OF THE DRAWINGS

In FIGS. 3 to 7: 101—workpiece stage; 102—object under inspection (OUI); 103—beam-splitting prism; 104—relay objective lens; 111, 112 and 113—detectors; 121, 122 and 123—flickering light sources; 131—bright-field illuminator; 132—dark-field illuminator; 140—synchronization controller; 141—master computer.

DETAILED DESCRIPTION

Particular embodiments of the present invention will be described in detail below with reference to the accompanying drawings so that the above objects, features and advantages of the invention will become more apparent and readily understood. It is noted that the figures are provided in a very simplified form and not necessarily drawn to scale, with the only intention to facilitate convenience and clarity in explaining the embodiments.

Embodiment 1

Figure 3:
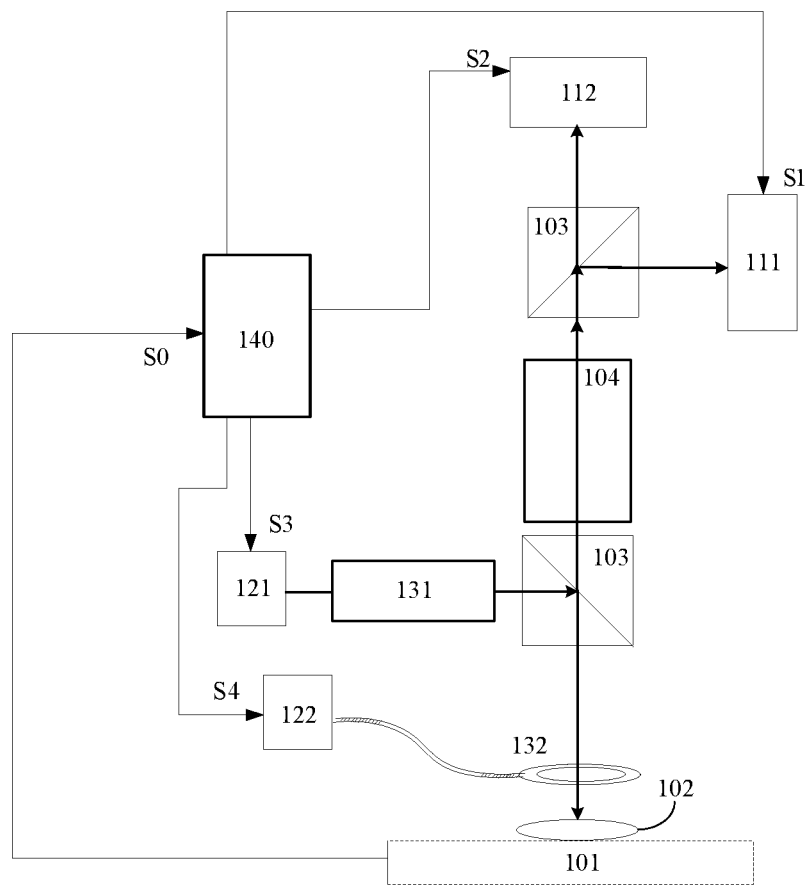
FIG. 3 is a structural schematic of an AOI device according to a first embodiment of the present invention.

As shown in FIG. 3, an automatic optical inspection (AOI) device provided in the present invention includes:

a workpiece stage 101, configured to support and carry an object under inspection (OUI) 102 to move during scanning, the workpiece stage 101 being able to send out a first synchronization signal S0 upon reaching a predetermined position; and a plurality of detectors. In this embodiment, two detectors, i.e., a first detector 111 and a second detector 112 are provided. The detectors 111, 112 may be used to individually capture images upon receipt of respective second synchronization signals S1, S2.

The AOI device further includes light sources. Preferably, the number of the light sources is the same as that of the detectors. Under the control of a control signal, each of the light sources is able to emit light for a predetermined period of time. For example, in this embodiment, the light sources may be implemented as flickering light sources each able to produce pulsed light under the control of a control signal. In correspondence with the detectors, in this embodiment, two light sources, i.e., a first light source 121 and a second light source 122, may be provided, in which the first light source 121 is a bright-field light source configured to work with a bright-field illuminator 131 to perform illumination with a bright-field configuration, while the second light source 122 is a dark-field light source is configured to cooperate with a dark-field illuminator 132 to carry out illumination with a dark-field configuration. The light source 121, 122 may individually emanate pulsed light upon receiving respective third synchronization signals S3, S4. In particular, in this embodiment, a plurality of beam-splitting prisms 103 may be provided to separate or combine light from the two light sources. Optionally, a relay objective lens 104 may be disposed between the beam-splitting prisms 103. The arrangement of the beam-splitting prisms and the relay objective lens and their role in altering the propagation directions of light beams belong to common knowledge in the art and are not essential to the subject matter of the present invention. Therefore, a further detailed description of them will be omitted herein.

The AOI device further includes a synchronization controller 140. The synchronization controller 140 is configured to receive the first synchronization signal S0 from the workpiece stage 101 and to provide the second synchronization signal S1, S2 to the detectors 111, 112 and the third synchronization signals S3, S4 to the light sources 121, 122 so as to control the light sources 121, 122 to be synchronized with the detectors 111, 112 to perform measurements. As a result, each of the detectors obtains images under the illumination of a corresponding one of the light sources.

Figure 1:
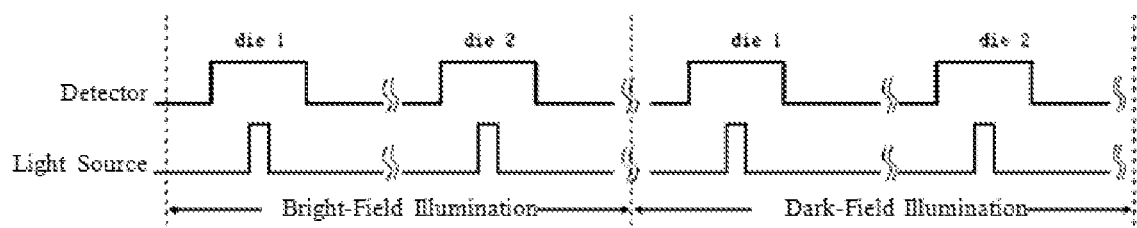
FIG. 1 is a timing diagram of a conventional AOI method.
Figure 2:
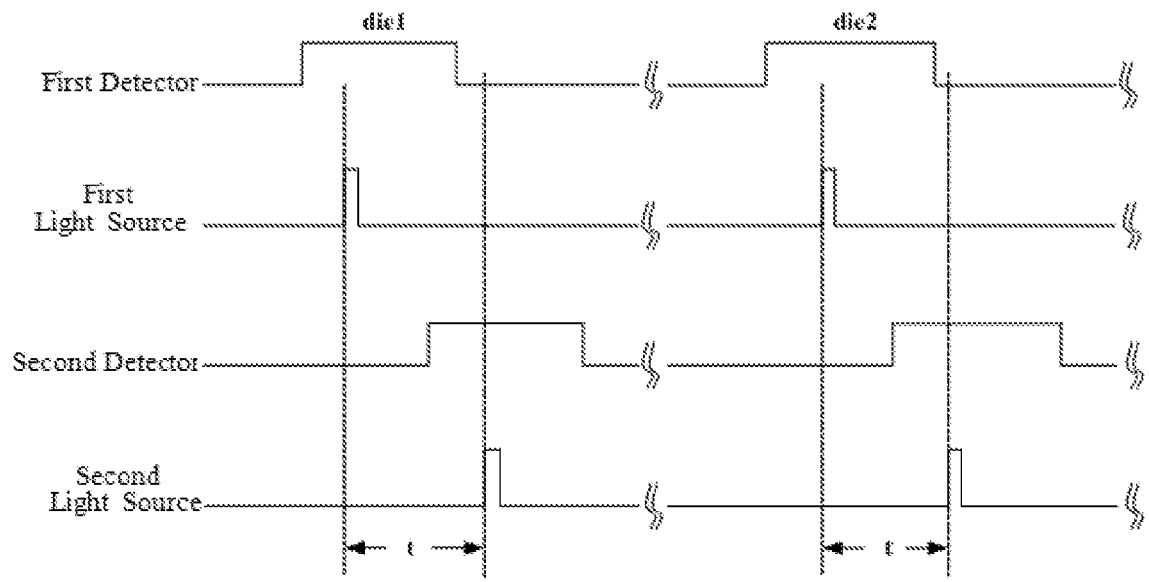
FIG. 2 is a timing diagram of an AOI method according to the present invention.

According to the present invention, at least two light source/detector pairs are provided and are configured for simultaneous imaging and inspection under conditions with respective different measurement configurations. FIG. 2 shows a timing diagram of scanning and inspection of an OUI 102. At first, the first detector 111 is activated to capture images, concurrently with the first light source 121 being activated to allow exposure and measurement with a first measurement configuration. Within a very short time after the completion of the exposure by the first light source 121, the second detector 112 is activated to capture images. After the first detector 111 finalizes its image integration, i.e., after the first detector 111 is deactivated, the second light source 122 is activated to allow the second detector 112 to perform exposure and measurement with a second configuration. In this process, the first detector 111 captures images under the illumination by the activated first light source 121, while the second detector 112 obtains images under the illumination by the activated second light source 122. The two light sources 121, 122 correspond to different optical measurement configurations. Therefore, with the present invention, images can be obtained with two different measurement configurations with a minimal delay. Throughout the process, the workpiece stage 101 is always moving for scanning. Assuming the workpiece stage 101 scans at a speed of vs, and the two light sources 121, 122 emit light with a time delay of t, then within the period of time between measurements carried out with the two measurement configurations, the distance the OUI 102 translates in the scanning direction of the workpiece stage 101 can be calculated as $\Delta S = vs \times t$. Typically, $t=50$ μs and $vs=200$ m/s, so $\Delta S=10$ μm. Since the size of the field of view (FoV) for the measurement is usually on the order of a few millimeters (mm) to 10-20 mm, a positional deviation between images captured with the different measurement configurations are only on the order of $1/100$ to $1/1000$, compared to the FoV size. Thus, according to the present invention, through the timing control over the multiple light source/detector pairs by the synchronization controller 140, the plurality of detectors can capture images in different illumination modes according to a certain timing profile. In this way, inspection with the multiple measurement configurations can be accomplished within a single scan of the workpiece stage 101, resulting in a significant improvement in inspection efficiency.

Figure 4:
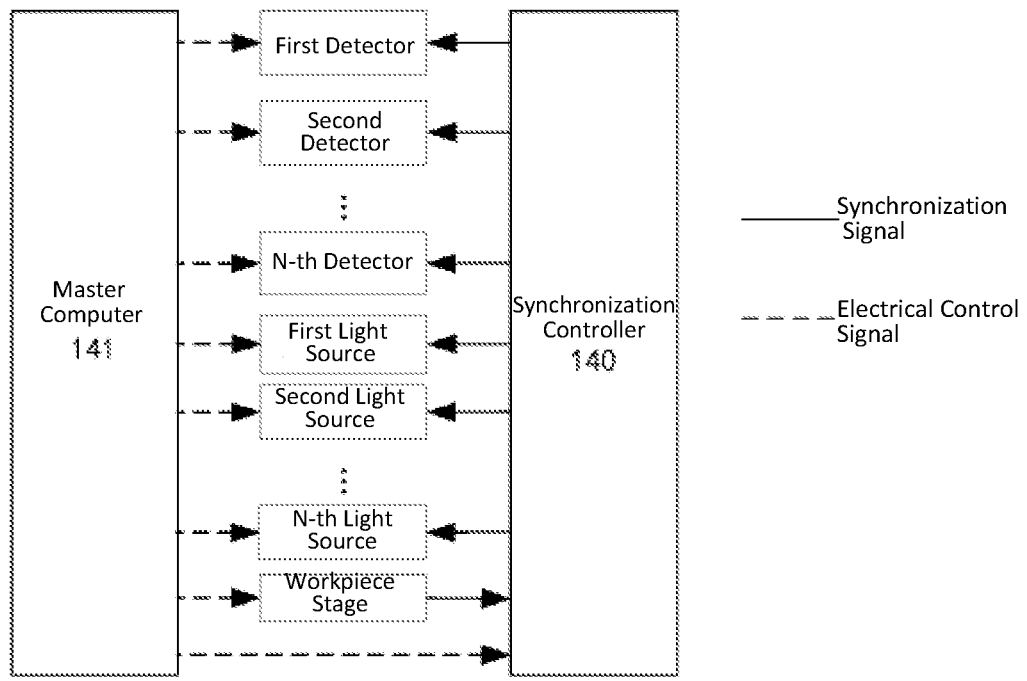
FIG. 4 shows the architecture of a synchronization control system according to the first embodiment of the present invention.

Preferably, with particular reference to FIG. 4, the AOI device may further include a master computer 141. The master computer 141 is signal-coupled to each of the detectors (including the first detector 111, the second detector 112, . . . , and an n-th detector), the light sources (including the first light source 121, the second light source 122, . . . , and an n-th light source), the workpiece stage 101 and the synchronization controller 140. In other words, the master computer 141, the detectors, the light sources, the workpiece stage 101 and the synchronization controller 140 are combined by the synchronization signals and electrical control signals into a synchronization control system which is able to ensure that when any one of the light sources is illuminating the OUI, only the one of the detectors corresponding to this light source is activated in order to avoid interfering with the inspection by any other detector.

Preferably, the light sources 121, 122 are implemented as flickering LEDs or flickering Xe lamps, which emit visible light, infrared or ultraviolet light and provide light sources respectively for bright- and dark-field conditions.

Preferably, the OUI 102 is a wafer, an LED substrate or a TFT panel. It is to be noted that while the embodiments herein are described in the context of wafer inspection, the present invention is not so limited, because it is applicable to LED, TFT, solar panel, PCB and other similar applications.

Figure 5:
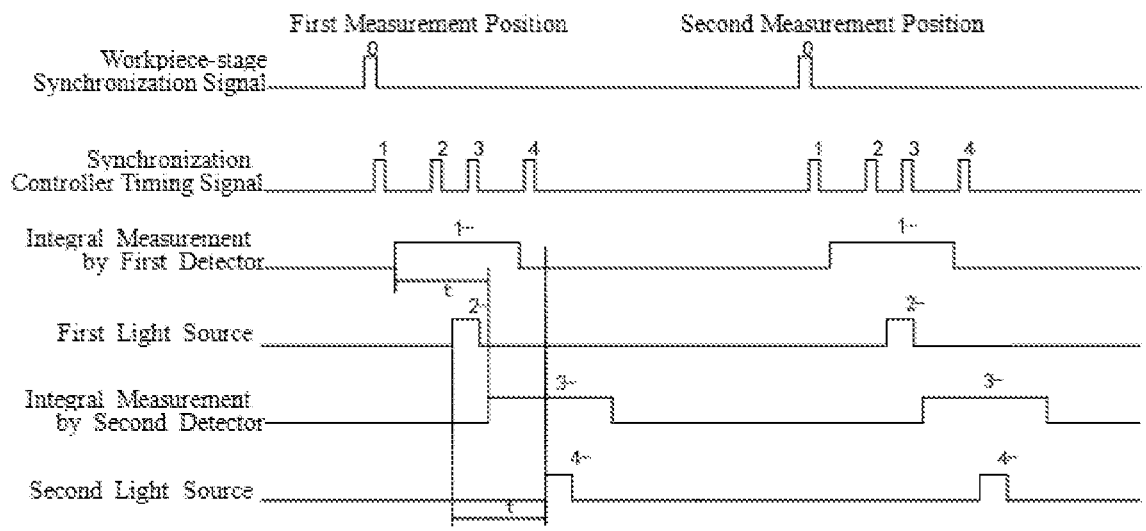
FIG. 5 is a timing diagram of an AOI method according to the first embodiment of the present invention.

The present invention also provides an AOI method, a timing program of which is shown in FIG. 5. With combined reference to FIG. 3, the method includes the steps of:

S1) moving the OUI 102 to a first measurement position and sending a first synchronization signal S0 (Pulse 0 in FIG. 5) to the synchronization controller 140, by the workpiece stage 101 on which the OUI 102 is carried;

S2) sending a second synchronization signal S1 (Pulse 1 in FIG. 5) to the first detector 111 by the synchronization controller 140 based on its own delay conditions, thereby triggering the activation of the first detector 111 for an integral measurement (Pulse 1– in FIG. 5);

S3) sending a third synchronization signal S3 (Pulse 2 in FIG. 5) to the first light source 121 by the synchronization controller during the integral measurement of the first detector 111, emitting pulsed light (Pulse 2– in FIG. 5) by the first light source 121, for the first illumination configuration, i.e., bright-field illumination, during the integral measurement of the first detector 111 and obtaining images of the OUI 102 by the first detector 111 under the illumination of the first light source 121 (i.e., bright-field illumination);

S4) subsequent to the completion of the optical emission of the first light source 121, after a very short time delay, i.e., before the first detector 111 is deactivated, sending a second synchronization signal S2 (Pulse 3 in FIG. 5) to the second detector 112 by the synchronization controller 140, thereby triggering the activation of the second detector 112 for an integral measurement (Pulse 3– in FIG. 5), wherein since the second detector 112 starts the integral measurement only subsequent to the completion of the optical emission of the first light source 121, it will not mistakenly capture images with the first measurement configuration;

S5) after the first detector 111 finalizes the integral measurement (i.e., the first detector 111 is deactivated), and during the integral measurement of the second detector 112, sending a third synchronization signal S4 (Pulse 4 in FIG. 5) to the second light source 122 by the synchronization controller 140, emitting pulsed light (Pulse 4– in FIG. 5) by the second light source 122, for the second illumination configuration, i.e., dark-field illumination, during the integral measurement of the second detector 112, and obtaining images by the second detector 112 under the illumination of the second light source 122 (i.e., dark-field illumination), wherein since the second light source 122 is activated after the first detector 111 finalizes the integral measurement, the first detector 111 will not mistakenly capture images with the second measurement configuration; and S6) moving the OUI 102 to a new measurement position and sending another first synchronization signal S0 to the synchronization controller 140 by the workpiece stage 101, and repeating steps S2-S6, until images of the OUI 102 have been captured at all measurement positions with the different measurement configurations.

As apparent from the timing diagram, at each measurement position, the detectors capture images with a time delay t, which is primarily constrained by a pulse width of the flickering light sources. At present, mainstream flickering light sources, such as flickering LEDs and Xe lamps, have a pulse width typically not greater than 100 µs or 50 µs. In general, the workpiece stage 101 in the AOI device scans at a speed of 200 mm/s, so there is a positional deviation of about 10 µm-20 µm between images captured by the different detectors at each measurement position. Compared to the size of the measurement FoV that is usually from several millimeters (mm) to 10-20 mm, the positional deviation between images captured with the different measurement configurations are only on the order of 1/100 to 1/1000. During a defect identification algorithm conducted on two so-captured images, identical regions of the images (accounting for about 99%-99.9%) may be selected and processed. This entails a solution capable of measuring the same measurement position of the OUI 102 simultaneously with two different measurement configurations during scanning.

Preferably, the AOI method may further include providing a master computer 141 which is signal-coupled to each of the detectors, the light sources, the workpiece stage 101 and the synchronization controller 140. The master computer 141 is configured to set parameters of the synchronization controller 140, parameters of the detectors and brightness levels of the light sources and to control the movement of the workpiece stage 101.

In addition, the present invention is not limited to the bright-field and dark-field illumination configurations commonly-used in the field of AOI. As apparent from the synchronization control principles of the present invention, the invention is easily scalable to inspection with more than two different illumination modes, simply by incorporating additional light source(s) and corresponding detector(s) or even by technically possible shared use of the detectors and performing timing control over the various light source/detector pairs so as to ensure that during any one of the light sources is illuminating the OUI, only the one of the detectors corresponding to this light source is activated in order to avoid interfering with the inspection by any other detector. In this way, inspection with more measurement configurations with an extremely small time delay, i.e., substantially in synchronization, is possible.

Embodiment 2

Figure 6:
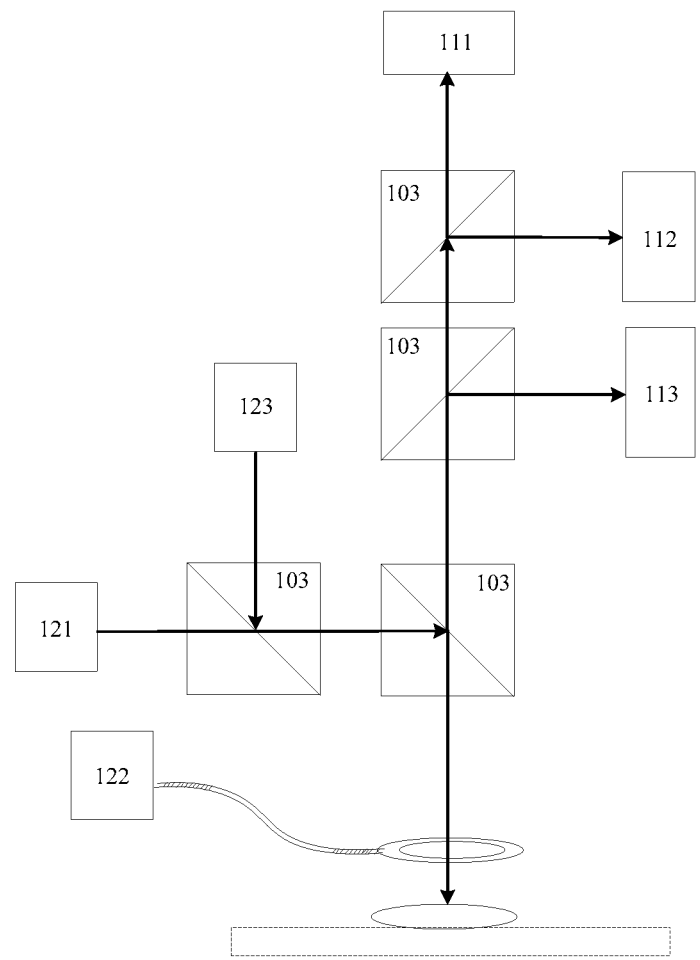
FIG. 6 is a structural schematic of an AOI device according to a second embodiment of the present invention.

With particular reference to FIG. 6, this embodiment differs from Embodiment 1 in incorporating three light sources 121, 122, 123 which are respectively a bright-field light source, a dark-field light source and an infrared light source, i.e., additionally including the infrared light source, compared to Embodiment 1. Preferably, the infrared light source is an infrared LED emitting light with a wavelength of about 780 nm or longer. Accordingly, the number of the detectors is increased to three. These detectors are indicated at 111, 112 and 113 in the figure and are configured to capture images respectively under bright-field illumination, dark-field illumination and infrared illumination. Further, two beam-splitting prisms are added in the optical path for combining infrared light and visible light or separating them apart. The remainder of this embodiment is similar to that of Embodiment, and thus will not be further described herein for the sake of simplicity. Through timing control, it is ensured that during any one of the light sources is illuminating the OUI, only the one of the detectors corresponding to this light source is activated, in order to avoid interfering with any other detector. In this embodiment, images can be captured under three illumination conditions, i.e., bright-field illumination by visible light, dark-field illumination and infrared illumination, in a single scanning measurement process, allowing adaptation to more process variations of the OUI 102.

Embodiment 3

Figure 7:
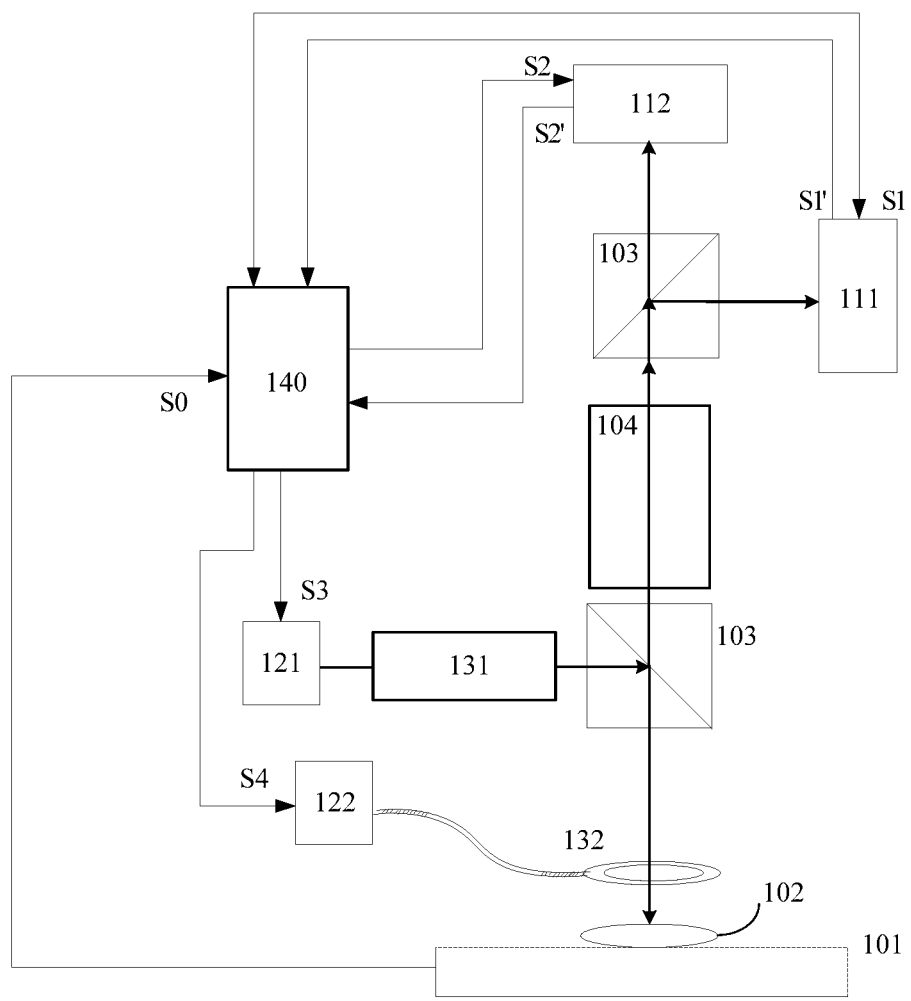
FIG. 7 is a structural schematic of an AOI device according to a third embodiment of the present invention.

With particular reference to FIG. 7, this embodiment differs from Embodiment 1 in that the detectors 111, 112 are able to send fourth synchronization signals S1', S2' to the synchronization controller 140, upon receipt of the fourth synchronization signals S1', S2', the synchronization controller 140 triggers the activation of the corresponding light sources 121, 122 by sending third synchronization signals S3, S4 to them.

Figure 8:
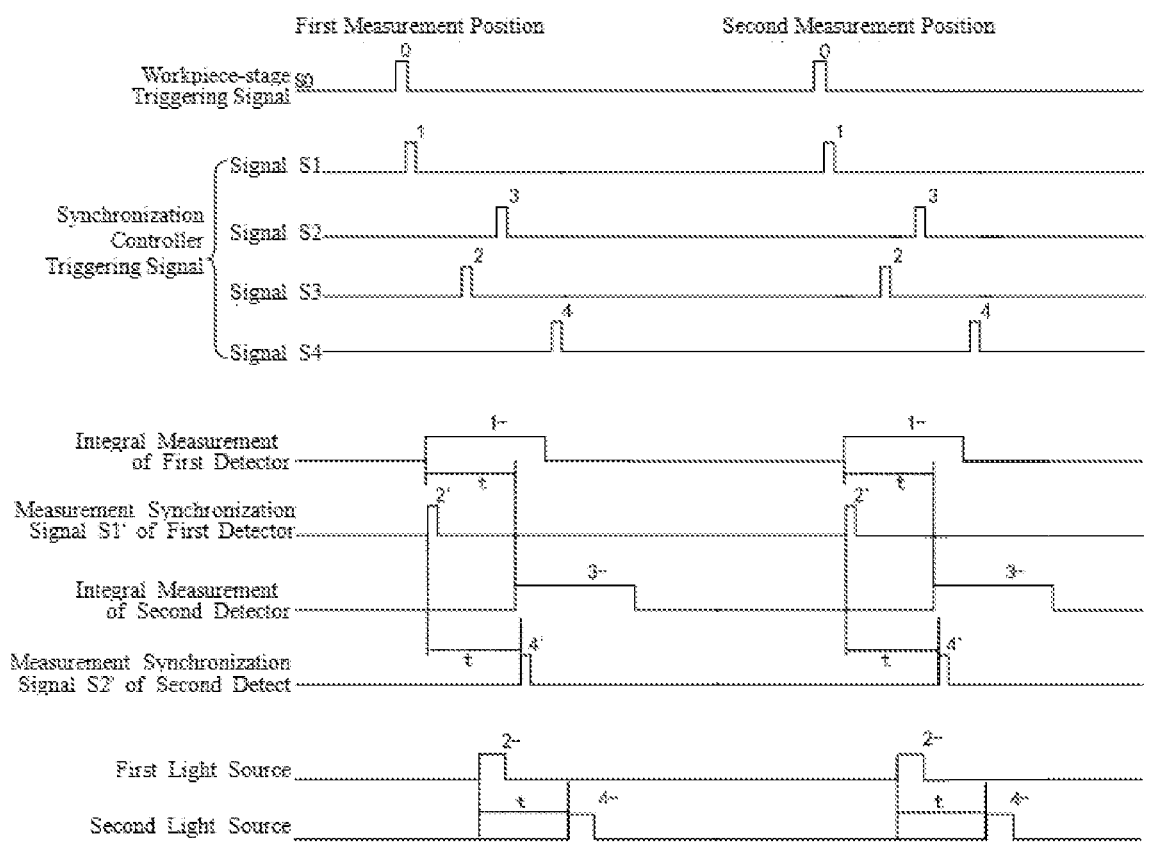
FIG. 8 is a timing diagram of an AOI method according to the third embodiment of the present invention.

Referring to FIG. 8, in this embodiment, the AOI method is accordingly as follows:

The workpiece stage 101 carries the OUI 102 to move to a measurement position and sends out a first synchronization signal S0. Up receiving the signal S0, the synchronization PCB or synchronization controller 140 generates second synchronization signals S1 and S2 for the first detector 111 and the second detector 112. Wherein, there is a time delay between S1 and S2, which is configured by the synchronization controller 140. In response to the respective signals S1 and S2, the first detector 111 and the second detector 112 start to perform integral measurements and feed the fourth synchronization signals S1' and S2' back to the synchronization controller 140. The synchronization controller 140 receives the signals S1' and S2' and, based on the signals S1' and S2', produces the third synchronization signals S3 and S4 for the first light source 121 and the second light source 122. When receiving the respective signals S3 and S4, the first light source 121 and the second light source 122 are activated, allowing the first detector 111 to capture images under the illumination of the first light source 121 and allowing the second detector 112 to capture images under the illumination of the second light source 122.

Of course, the fourth synchronization signals S1', S2' may also be directly received by the corresponding light sources 121, 122 to trigger the activation of these light sources 121, 122, thereby enabling synchronized measurements.

In addition, Embodiment 1 may be combined with Embodiment 3. That is, one of the light source/detector pairs is controlled by the synchronization controller 140, while in the other light source/detector pair, the light source is directly controlled by the detector.

Similarly, in Embodiment 3, through timing control over the detectors and light sources by the synchronization controller 140, it is ensured that during any one of the light sources is illuminating the OUI, only the one of the detectors corresponding to this light source is activated, in order to avoid interfering with any other detector. As a result, the detectors capture images of the OUI 102 in the respective illumination modes substantially in synchronization.

In summary, the present invention provides an AOI device and method. The device includes: a plurality of detectors for capturing images of an OUI; a plurality of light sources for illuminating the OUI in different illumination modes; and a synchronization controller 140 signal-coupled to both the plurality of detectors and the plurality of light sources. The synchronization controller 140 is configured to directly or indirectly control the plurality of detectors and the plurality of light sources based on the position of the OUI 102 so that each of them is individually activated and deactivated according to a timing profile, that each of the detectors is able to capture images of the OUI in an illumination mode provided by a corresponding one of the light sources, and that when any one of the light sources is illuminating the OUI, only the one of the detectors corresponding to this light source is activated. According to present invention, a synchronization control system is adopted to perform measurement timing control over two or more light source/detector pairs, which enables inspection with different measurement configurations within a single scanning measurement process. With the timing control by the synchronization control system, the frame rate for two-dimensional image acquisition can be sharply increased by two orders of magnitude, from the conventional only about 100 hertz to about 10,000 hertz, almost doubling the conventional inspection efficiency.

It is apparent that those skilled in the art can make various modifications and variations to the present invention without departing from the spirit and scope thereof. Accordingly, the invention is intended to embrace all such modifications and variations if they fall within the scope of the appended claims and equivalents thereof.

What is claimed is:

1. An automatic optical inspection device for inspecting an object under inspection carried on a workpiece stage, comprising:
   the workpiece stage being able to send out a first signal during movement for scanning;
   a plurality of detectors for capturing images of the object under inspection;
   a plurality of light sources for illuminating the object under inspection with different illumination modes; and
   a synchronization controller signal-coupled to the plurality of detectors and the plurality of light sources, the synchronization controller configured to directly or indirectly control the plurality of detectors and the plurality of light sources based on a position of the object under inspection so that each of the plurality of detectors and the plurality of light sources is individually activated and deactivated according to a corresponding timing sequence, such that: each of the plurality of detectors is able to capture images of the object under inspection in an illumination mode provided by a corresponding one of the plurality of light sources; and when one of the plurality of light sources is illuminating the object under inspection, only one of the plurality of detectors corresponding to the one of the plurality of light sources is activated,
   wherein each of the plurality of detectors is able to send a fourth signal to the synchronization controller when activated, wherein the synchronization controller is configured to receive the first signal sent by the workpiece stage and to provide a plurality of second signals to the plurality of detectors, and wherein the synchronization controller is further configured to, after receipt of the fourth signal, produce and send a third signal to a corresponding one of the plurality of light sources to activate the corresponding one of the plurality of light sources.

2. The automatic optical inspection device of claim 1, wherein the synchronization controller is further signal-coupled to the workpiece stage, and wherein the position of the object under inspection is obtained from the first signal sent by the workpiece stage to the synchronization controller.

3. The automatic optical inspection device of claim 1, further comprising a master computer signal-coupled to each of the plurality of detectors, the plurality of light sources, the workpiece stage and the synchronization controller.

4. The automatic optical inspection device of claim 1, wherein the synchronization controller is configured to control the activation and deactivation of each of the plurality of detectors by sending the plurality of second signals to the plurality of detectors.

5. The automatic optical inspection device of claim 1, wherein the plurality of light sources comprises at least two of a bright-field light source, a dark-field light source and an infrared light source.

6. The automatic optical inspection device of claim 1, wherein the plurality of light sources are pulsed light generators.

7. The automatic optical inspection device of claim 6, wherein the pulsed light generators are flickering LEDs or flickering Xe lamps.

8. The automatic optical inspection device of claim 5, wherein the infrared light source is an infrared LED that emits light with a wavelength of 780 nm or longer.

9. The automatic optical inspection device of claim 1, wherein the object under inspection is a wafer, an LED substrate or a TFT panel.

10. The automatic optical inspection device of claim 1, wherein a number of the plurality of detectors is equal to a number of the plurality of light sources.

11. An automatic optical inspection (AOI) method for inspecting an object under inspection carried on a workpiece stage, comprising:

providing the workpiece stage being able to send out a first signal during movement for scanning;

providing a plurality of detectors for capturing images of the object under inspection, a plurality of light sources for illuminating the object under inspection with different illumination modes and a synchronization controller signal-coupled to the plurality of detectors and the plurality of light sources; and directly or indirectly controlling, by the synchronization controller, the plurality of detectors and the plurality of light sources based on a position of the object under inspection so that each of the plurality of detectors and the plurality of light sources is individually activated and deactivated according to a corresponding timing sequence, such that: each of the plurality of detectors is able to capture images of the object under inspection in an illumination mode provided by a corresponding one of the plurality of light sources; and when one of the plurality of light sources is illuminating the object under inspection, only one of the plurality of detectors corresponding to the one of the plurality of light sources is activated, wherein each of the plurality of detectors is able to send a fourth signal to the synchronization controller when activated, wherein the synchronization controller is configured to receive the first signal sent by the workpiece stage and provide a plurality of second signals to the plurality of detectors, and wherein the synchronization controller is further configured to, after receipt of the fourth signal, produce and send a third signal to a corresponding one of the plurality of light sources to activate the corresponding one of the plurality of light sources.

12. The automatic optical inspection method of claim 11, comprising the steps of:
   S1) moving the object under inspection to a measurement position and sending the first signal to the synchronization controller, by the workpiece stage on which the object under inspection is carried;
   S2) sending the second signal to a first detector of the plurality of detectors by the synchronization controller, thereby triggering an activation of the first detector;
   S3) sending a third signal to a first light source of the plurality of light sources by the synchronization controller, emitting a first pulsed light by the first light source during the activation of the first detector, and obtaining images of the object under inspection by the first detector under an illumination of the first light source;
   S4) subsequent to completion of the illumination of the first light source, sending another second signal to a second detector of the plurality of detectors by the synchronization controller, thereby triggering an activation of the second detector;
   S5) after the first detector is deactivated, sending another third signal to a second light source of the plurality of light sources by the synchronization controller, emitting a second pulsed light by the second light source during the activation of the second detector, and obtaining images of the object under inspection by the second detector under an illumination of the second light source; and
   S6) moving the object under inspection to a new measurement position and sending another first signal to the synchronization controller by the workpiece stage, and repeating steps S2)-S6) until images of the object under inspection have been captured at all measurement positions by the plurality of detectors under the illumination of the plurality of light sources.

13. The automatic optical inspection method of claim 11, further comprising: providing a master computer signal-coupled to each of the plurality of detectors, the plurality of light sources, the workpiece stage and the synchronization controller; and setting parameters of the synchronization controller, parameters of the plurality of detectors, brightness levels of the plurality of light sources and controlling a movement of the workpiece stage, by the master computer.

14. The automatic optical inspection method of claim 11, comprising the steps of:
   S1) moving the object under inspection to a measurement position and sending the first signal to the synchronization controller, by the workpiece stage on which the object under inspection is carried;
   S2) sending the second signal to a first detector of the plurality of detectors by the synchronization controller, thereby triggering an activation of the first detector;
   S3) sending a third signal to a first light source of the plurality of light sources by the first detector so as to trigger the first light source to emit a first pulsed light during the activation of the first detector and obtaining images of the object under inspection by the first detector under an illumination of the first light source;
   S4) subsequent to completion of the illumination of the first light source, sending another second signal to a second detector of the plurality of detectors by the synchronization controller, thereby triggering an activation of the second detector;
   S5) after the first detector is deactivated, sending another third signal to a second light source of the plurality of light sources by the second detector so as to trigger the second light source to emit a second pulsed light during the activation of the second detector obtaining images of the object under inspection by the second detector under an illumination of the second light source; and
   S6) moving the object under inspection to a new measurement position and sending another first signal to the synchronization controller by the workpiece stage, and repeating steps S2)-S6) until images of the object under inspection have been captured at all measurement positions by the plurality of detectors under the illumination of the plurality of light sources.

\* \* \* \* \*